United States Patent
Blass et al.

(10) Patent No.: US 11,356,449 B2
(45) Date of Patent: Jun. 7, 2022

(54) MANAGING ACCESS TO VULNERABILITY DATA AT SCALE

(71) Applicant: Walmart Apollo, LLC, Bentonville, AR (US)

(72) Inventors: Oscar Blass, Bentonville, AR (US); Randal Parsons, Rogers, AR (US); Austin Lucas, Bentonville, AR (US); Serena Curtin, Bella Vista, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 390 days.

(21) Appl. No.: 16/584,039

(22) Filed: Sep. 26, 2019

(65) Prior Publication Data

US 2020/0128016 A1 Apr. 23, 2020

Related U.S. Application Data

(60) Provisional application No. 62/748,422, filed on Oct. 20, 2018.

(51) Int. Cl.
*H04L 9/40* (2022.01)
*G06F 8/71* (2018.01)

(52) U.S. Cl.
CPC .............. *H04L 63/101* (2013.01); *G06F 8/71* (2013.01); *H04L 63/1433* (2013.01)

(58) Field of Classification Search
CPC ...... H04L 63/101; H04L 63/1433; G06F 8/71
See application file for complete search history.

(56) References Cited

U.S. PATENT DOCUMENTS

| | | | |
|---|---|---|---|
| 8,776,239 B2 | 7/2014 | De Keukelaere et al. | |
| 8,839,441 B2 | 9/2014 | Saxena et al. | |
| 9,104,878 B1 | 8/2015 | Khairetdinov | |
| 9,703,552 B2 | 7/2017 | Bates et al. | |
| 9,965,633 B2 | 5/2018 | Brucker et al. | |
| 10,187,457 B1* | 1/2019 | Reynolds ............... | G06F 11/073 |
| 2002/0184615 A1 | 12/2002 | Sumner et al. | |

(Continued)

FOREIGN PATENT DOCUMENTS

WO    WO2014130472    *  8/2014  ............. G06F 21/00

OTHER PUBLICATIONS

John Viega, J.T. Bloch, Yoshi Kohno, Gary McGraw "ITS4 : A Static Vulnerability Scanner for C and C++ Code", IEEE, 2000, p. 257-267 (Year: 2000).*

(Continued)

*Primary Examiner* — Catherine Thiaw

(57) ABSTRACT

Systems and methods are disclosed for managing access to vulnerability data in large scale operations, such as by synchronizing access to vulnerability data for active developers who have recently modified source code. For example, source vulnerability scanner (SVS) access may be granted to source code developers identified in a source control management system (SCM) as having made modifications within some recent timeframe, and may further revoke access for stale user accounts. This efficiently implements the information security principle of least privilege, and may easily scale to operations involving hundreds or thousands of active developers and asset owners, and tens of thousands of network assets ⁻ and even larger operations.

18 Claims, 5 Drawing Sheets

(56) References Cited

U.S. PATENT DOCUMENTS

| | | |
|---|---|---|
| 2005/0010821 A1 | 1/2005 | Cooper et al. |
| 2005/0223357 A1 | 10/2005 | Banerjee et al. |
| 2012/0304300 A1 | 11/2012 | LaBumbard |
| 2014/0331326 A1 | 11/2014 | Thakur |
| 2015/0106939 A1 | 4/2015 | Lietz et al. |
| 2015/0235042 A1* | 8/2015 | Salehpour ............... G06F 21/44 726/4 |
| 2017/0078322 A1 | 3/2017 | Seiver et al. |
| 2019/0095626 A1* | 3/2019 | Mohan .................. G06F 21/577 |

OTHER PUBLICATIONS

Natarajan Meghanathan, "Source Code Analysis to Remove Security Vulnerabilities in Java Socket Programs: A Case Study", International Journal of Network Security & its Applications (IJNSA), vol. 5, No. 1, Jan. 2013, pp. 1-16.

Copenheaver, Blaine R., "International Search Report", International Application No. PCT/US2019/053191, dated Dec. 6, 2019, 2 pages.

Copenheaver, Blaine R., "Written Opinion", International Application No. PCT/US2019/053191, dated Dec. 6, 2019, 8 pages.

Stephanie Dunn, "ISO/IEC27000: Asset Management", In: Tenable, Jun. 20, 2016, retrieved on Nov. 16, 2019, https://www.tenable.com/sc-dashboards/isoiec27000-asset-management, 9 pages.

\* cited by examiner

MANAGING ACCESS TO VULNERABILITY DATA AT SCALE

BACKGROUND

Computer applications should operate with a relatively high degree of stability and security to minimize risks of disruptions to business operations and theft of business data, such as financial, employee, and customer data. Vulnerabilities are typically introduced when an application is coded incorrectly by developers. Modern scanners can detect vulnerabilities in code and inform developers to revisit or correct code. However, if the vulnerability data is not protected it is a valuable source of information to an adversary, effectively providing a roadmap for how to attack an application and compromise it. Thus, protection of vulnerability data is essential. Typically, though, Source Control Management systems (SCMs), which manage application source code version control for developers, and Source Vulnerability Scanners (SVSs) do not use the same authentication and management systems, because they may operate independently, under the control of different entities.

SUMMARY

Systems and methods are disclosed that manage access to vulnerability data in large scale operations, such as by synchronizing access to vulnerability data for active developers who have recently modified source code. For example, source vulnerability scanner (SVS) access may be granted to source code developers identified in a source control management system (SCM) as having made modifications within some recent timeframe, and may further revoke access for stale user accounts. This efficiently implements the information security principle of least privilege, and may easily scale to operations involving hundreds or thousands of active developers and asset owners, and tens of thousands of network assets ⁻ and even larger operations.

A disclosed system for managing access to vulnerability data comprises: an asset management component operative to provide version control for a network asset; a vulnerability scan component operative to determine whether the network asset has a vulnerability; an integration component managing a workflow of receiving the network asset from the asset management component and requesting a vulnerability scan of the received network asset by the vulnerability scan component; and a user synchronization component for, responsive to a trigger event, provisioning user access rights for the vulnerability scan component, wherein provisioning user access rights for the vulnerability scan component comprises: determining a user ID associated with the network asset; determining a timeframe of the user ID association with the network asset; and based at least on the timeframe being less than a time-out threshold, granting the user ID access rights to the vulnerability scan component.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
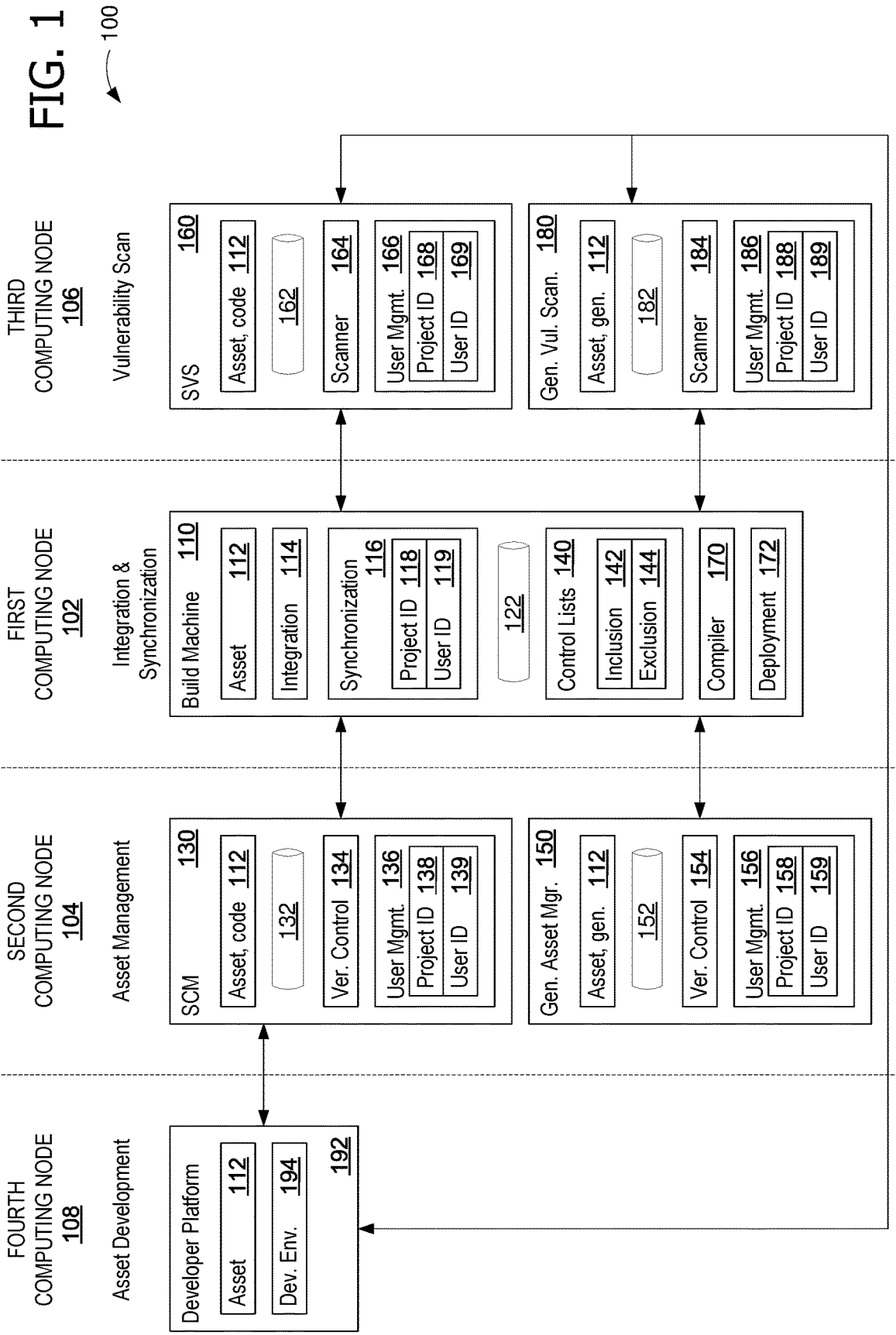
FIG. 1 illustrates an exemplary block diagram of an arrangement for managing access to vulnerability data at scale.

A more detailed understanding may be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that may in isolation and out of context be read as absolute and therefore limiting, may only properly be read as being constructively preceded by a clause such as 'In at least some embodiments, . . . _ For brevity and clarity of presentation, this implied leading clause is not repeated ad nauseum.

Currently, Source Control Management systems (SCMs), which manage application source code version control for developers, and Source Vulnerability Scanners (SVSs) do not use the same authentication and management systems, because they may operate independently, under the control of different entities. An SVS or general network asset vulnerability scanner (such as a platform that scans for website vulnerabilities) typically requires manual user management and access control. For entities operation at a large scale, with potentially thousands of active developers and network asset owners, managing access to vulnerability data manually may be expensive and burdensome, due to a large administrative operation.

When businesses adopt cloud-based services, they may provide services to end users through a federation of multiple independent business partners. Each business partner must be able to provision end users for their service. However, often it may not be practical to provision all end users to all services before the service is needed. Instead, businesses may adopt a just-in-time (JIT) approach by provisioning end users to the business partners' services the first time they sign on to the service.

Referring to the figures, examples of the disclosure enable systems and methods that manage access to vulnerability data in large scale operations, such as by synchronizing access to vulnerability data for active developers who have recently modified source code. For example, source vulnerability scanner (SVS) access may be granted to source code developers identified in a source control management system (SCM) as having made modifications within some recent timeframe, and may further revoke access for stale user accounts. In an exemplary operation, a client of an SVS communicates with an SCM to determine whether certain source code had recently changed. The timeframe for "recently" (a time-out threshold) may be 30 days, 60 days, a financial quarter (approximately 90 days), or perhaps a longer period for some network assets. Access may be revoked when someone has not made any modifications recently, or is not a designated asset owner. Using recent modifications to determine who should have access to vulnerability data makes the information available to those specific people who need it, even while restricting the vulnerability data to a relatively small audience. This efficiently implements the information security principle of least privilege, and may easily scale to operations involving hundreds or thousands of active developers and asset owners, and tens of thousands of network assets ⁻ and even larger operations.

In some examples, a JIT approach is employed for user provisioning that manages access to critical project data (e.g., vulnerability data) automatically. Developers who have recently modified source code are allowed to access vulnerability data, while access is revoked for developers who have become inactive. This management scheme prevents users from being able to view data that is not relevant to their recent activities. In this manner, an important security principal of least privilege (PoLP) is applied. In information security, computer science, and other fields, PoLP, also known as the principle of minimal privilege or the principle of least authority, requires that in a particular abstraction layer of a computing environment, every module (such as a process, a user, or a program, depending on the subject) must be able to access only the information and resources that are necessary for its legitimate purpose.

In addition to implementing a security principle, the approach provided can also help reduce costs associated with managing network assets. For example, SVSs may require licenses, with a per-user license fee. Paying for licenses for inactive users may be wasteful, compared with removing inactive users so that active users can access the SVS licenses. That is, the number of SVS licenses may be limited to the expected number of active users, rather than a larger number of total users. Thus, if a user has not made any code changes in a threshold amount of time, that user can be deleted in order to reduce license usage.

FIG. 1 illustrates an exemplary block diagram of an arrangement 100 for managing access to vulnerability data at scale. A first computing node 102 provides integration and user synchronization; a second computing node 104 in communication with first computing node 102 provides asset management; a third computing node 106 in communication with first computing node 102 provides vulnerability scan capability; and a fourth computing node 108 in communication with second computing node 104 provides asset development. In operation, a developer (user) develops a network asset 112 in a development environment 194 on a developer platform 192. In some examples, developer platform 192 may be a processing unit or computing node, such as computing node 500 of FIG. 5. When the developer has reached a completion stage, developer platform 192 of fourth computing node 108 transmits network asset 112 to an asset management component (source control management system (SCM) 130 or general asset management component 150) of second computing node 104.

If network asset 112 (the asset being developed) is source code, a library function, or data for an application ('app_), it is transmitted to SCM 130. SCM 130 is an asset management component for source code; an example of an app for which the source code may be managed by SCM 130 is an on-line enrollment app for employee benefits. Otherwise, if network asset 112 is a generic network asset, such as perhaps a website page, it is transmitted to general asset management component 150. As illustrated, second computing node 104 holds two asset management components: SCM 130 and general asset management component 150. In the illustrated example, SCM 130 includes a repository 132 for storing the various source code versions, and a version control component 134 that manages versioning and documents modification history, including the user's identity (user ID) and a timeframe of the user modification (e.g., timeframe of the user ID association with network asset 112). To control access to repository 132, SCM 130 also includes a user management component 136 holding a list of project IDs 138 and a list of user IDs 139, associated with each of the projects identified in list of project IDs 138. That is, user access rights may be provisioned at second computing node 104 for specific project IDs.

Similarly, general asset management component 150 includes a repository 152 for storing the various source code versions, and a version control component 154 that manages versioning and documents modification history, including the user s identity (user ID) and a timeframe of the user modification (e.g., timeframe of the user ID association with network asset 112). To control access to repository 132, SCM 130 also includes a user management component 156 holding a list of project IDs 158 and a list of user IDs 159, associated with each of the projects identified in list of project IDs 158. The list of user IDs 159 may be asset owners. That is, user access rights are provisioned for specific project IDs. Assets managed by general asset management component 150 may include website pages and other network assets. In some examples, SCM 130 and general asset management component 150 may be a processing unit or computing node, such as computing node 500 of FIG. 5.

First computing node 102 is illustrated as holding a user synchronization component 116, an integration component 114, and a data store 122 in a build machine 110. Integration component 114 may be a continuous integration system that controls build machine 110 to build an app executable. The use of build machine 110 for building executables, rather than importing executables from developer platform 192 assists with reproducibility. This is because the configuration of build machine 110, including libraries and settings used by compiler 170, may be controlled be a smaller set of people than an entire developer community. In some examples, build machine 110 may be a processing unit or computing node, such as computing node 500 of FIG. 5.

Integration component 114 manages a workflow of receiving network asset 112 from an asset management component (SCM 130 or general asset management component 150) and requesting a vulnerability scan of received network asset 112 by a vulnerability scan component, either a source vulnerability scanner (SVS) 160 or a general vulnerability scan component 180 of third computing node 106. SVS 160 is a vulnerability scan component for source code; such as source code managed by SCM 130. General vulnerability scan component 180 is a vulnerability scan component for generic network assets, such as perhaps a website page, managed by general asset management component 150. It should be understood that, although in some examples, build machine 110 is capable of building apps, such as by compiling network asset 112 using a compiler 170 and deploying the compiled app using deployment component 172, it should be understood that build machine 110 may also handle generic network assets.

Responsive to a trigger event, user synchronization component 116 provisions user access rights for a vulnerability scan component, either SVS 160 or general vulnerability scan component 180. In some examples, user synchronization component 116 will provision only user access rights corresponding to users who have write permission on an asset management component (SCM 130 or general asset management component 150). A trigger event may be a code commit (e.g., a developer using developer platform 192 uploading network asset 112 to SCM 130 and indicating that it is ready for compilation), a general asset update, a timer countdown, or a manual instigation. Timer data and time-out threshold data may be stored in data store 122. In some examples, provisioning user access rights for a vulnerability scan component (SVS 160 or general vulnerability scan component 180) may include determining a user ID associated with network asset 112; determining a timeframe of the user ID association with network asset 112; and based at least on the timeframe being less than a time-out threshold, granting the user ID access rights to the vulnerability scan component. In some examples, provisioning user access rights for a vulnerability scan component may be subject to control lists 140. Control lists 140 includes an inclusion control list 142 and an exclusion control list 144. Inclusion control list 142 may be used, for example, to ensure certain specially-qualified users will retain access to network asset 112, even if they have not made any modifications for a long time. Exclusion control list 144 may be used, for example, to ensure that certain automated processes that modify assets, but are not human users, will not be granted access.

For example, provisioning may include determining whether the user ID is on exclusion control list 144, and based at least on the timeframe being less than a time-out threshold and the user ID not being on exclusion control list 144, granting the user ID access rights to the vulnerability scan component. In some examples, provisioning user access rights for a vulnerability scan component may also include based at least on the timeframe exceeding the time-out threshold, revoking the user ID access rights to the vulnerability scan component. In some examples, provisioning user access rights for a vulnerability scan component may also include determining whether the user ID is valid on an asset management component (SCM 130 or general asset management component 150), and based at least on the user ID not being valid on the asset management component, revoking the user ID access rights to the vulnerability scan component. In some examples, provisioning user access rights for a vulnerability scan component may also include determining a project ID associated with network asset 112 and provisioning user access rights for the project ID to the vulnerability scan component. That is, user access rights may be provisioned on third computing node 106 by synchronization component 116 for specific project IDs. See FIGS. 2-4 for additional description.

As illustrated, synchronization component 116 includes a list of project IDs 118 and list of user IDs 119, which were obtained from SCM 130 and/or general asset management component 150. List of a project IDs 118 and list of user IDs 119 are used in the course of synchronization component 116 provisioning a vulnerability scan component on third computing node 106 (SVS 160 or general vulnerability scan component 180). In some examples, the vulnerability scans may not be performed on build machine 110, but may instead be sent to a remote service at third computing node 106. In some examples, however, vulnerability scans may be performed on build machine 110. It should be understood that although a particular allocation of functionality is illustrated in FIG. 1, in some versions, functionality may be allocated differently.

Third computing node 106, in communication with first computing node 102, holds a vulnerability scan component, either SVS 160 or general vulnerability scan component 180. In some examples, third computing node 106 may be a collection of computing nodes in a cloud service or may SCM 130 and general asset management component 150 may be a processing unit or computing node, such as computing node 500 of FIG. 5. SVS 160 and general vulnerability scan component 180 are each operative to determine whether network asset 112 has a vulnerability. If network asset 112 is source code, determining whether network asset 112 has a vulnerability comprises determining whether source code has a programming vulnerability. If network asset 112 is a website page, determining whether network asset 112 has a vulnerability comprises determining whether there is a website vulnerability, such as a potential for a buffer overflow that might provide a malicious website visitor with administrator rights access.

To facilitate these operations, SVS 160 includes a data store 162, which holds vulnerability data and scan result details, and a scanner component 164, which uses vulnerability data in data store 162 when scanning network asset 112. For example, scanner component 164 may perform security checks for coding flaws, including improperly creating SQL commands, hard-coding passwords, failing to sanitize input or output. In some examples, scanner component 164 may locate network asset 112 using a source code uniform resource locator (URL).

Because vulnerabilities discovered in network asset 112 may be sensitive, SVS 160 controls access to data store 162 with a user management component 166 that holds a list of project IDs 168 and a list of user IDs 169, associated with each of the projects identified in list of project IDs 168. In some examples, at least some of the project IDs in list of project IDs 168 may be associated with a source code URL for network asset 112. User access rights may be provisioned at third computing node 106 for specific project IDs. In some examples, when a new source code URL is provided to SVS 160 that cannot be found within list of project IDs 168, a new project ID may be created, and the user then granted access. List of user IDs 169 may be updated by synchronization component 116 during the provisioning process, to either add new user IDs to a project ID (grant access) or remove user IDs from a project ID (revoke access).

Similarly, general vulnerability scan component 180 includes a data store 182, which holds vulnerability data and scan result details, and a scanner component 184, which uses vulnerability data in data store 182 when scanning network asset 112. Because vulnerabilities discovered in network asset 112 may be sensitive, general vulnerability scan component 180 controls access to data store 162 with a user management component 186 that holds a list of project IDs 188 and a list of user IDs 189, associated with each of the projects identified in list of project IDs 188. List of user IDs 189 may be updated by synchronization component 116 during the provisioning process, to either add new user IDs to a project ID (grant access) or remove user IDs from a project ID (revoke access).

Once synchronization component 116 has completed provisioning, a developer at fourth computing node 108 can access vulnerability data in whichever of data store 162 or data store 182 holds it. In this manner, sensitive data may be protected from those who should not see it, and revealed to those who should, with minimal overhead administrative labor effort. Thus, that arrangement 100 is able to manage access to vulnerability data at scale (at a large scale) efficiently. It should be noted that, in general, a user who has only read permissions on an asset management component (SCM 130 or general asset management component 150) will not generate modification data, and therefore should not be provisioned on the vulnerability scan component.

User synchronization can optionally occur at different events. That is, there are various different possible triggers for synchronization component 116. One trigger may be a build event for a software project, while another trigger may be a scheduled timer event. Synchronization component 116 would then determine the number of active users and the number of licenses being used for accessing SVS 160 (or general vulnerability scan component 180). In some examples, if synchronization component 116 is normally configured to run on a schedule, but the number of available licenses is nearly exhausted, synchronization component 116 may be additionally triggered to run at project build time, to trim some users newly-determined to be stale, and thus free up accessibility. This trimming of users, to free up licenses can further help reduce the costs associated with managing network asset 112, but not using up licenses for inactive users.

An active user is someone who has contributed code at some point in the past and is able to log into the system. Even if they have not modified code in a long time and all their access has been stripped away, they would log in and see nothing. This is because their permissions have aged out. They dont have access to anything. With this additional step that user would not be able to log in reducing the license usage count. One thing to note here inactive users can also be removed from the system. If you are deleted from your organizations list of users, there is no reason to consume a license.

Figure 2:
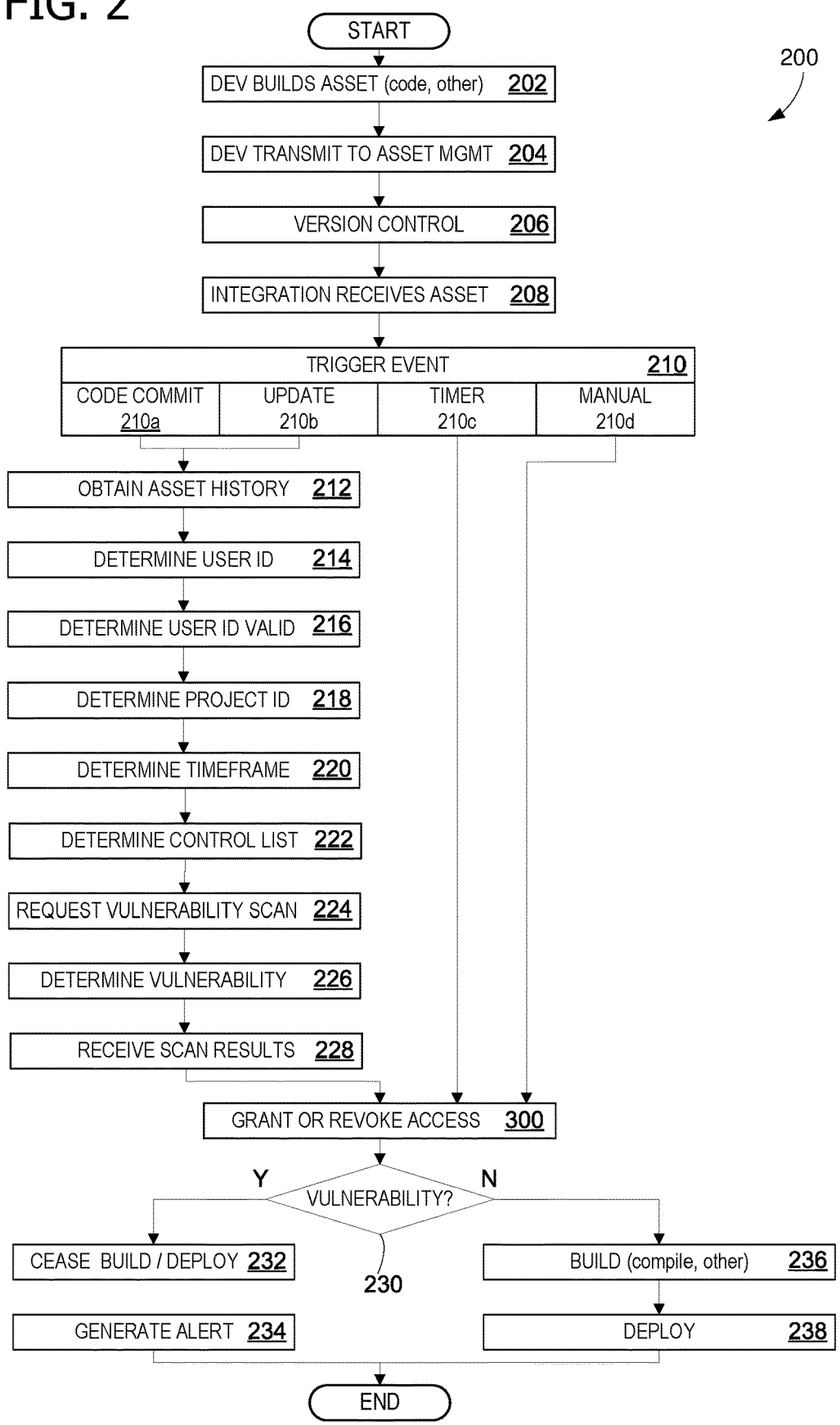
FIG. 2 shows a flow chart illustrating exemplary operations involved in managing access to vulnerability data at scale, that may be used with the arrangement of FIG. 1.

FIG. 2 shows a flow chart 200 illustrating exemplary operations involved in managing access to vulnerability data, that may be used with arrangement 100 of FIG. 1. The operations illustrated in flow chart 200 may be implemented on at least one processor, for example, performed by one or more compatible processing units or computing nodes, such as computing node 500 of FIG. 5. In operation 202, a developer creates or builds network asset 112, and in operation 204, the developer transmits network asset to an asset management component (SCM 130 for source code or general asset management component 150 for other assets). In operation 206, SCM 130 or general asset management component 150 performs version control on network asset 112, such as by recording the user ID and project ID associated with network asset 112, along with the timeframe when network asset 112 was modified or updated.

Operation 208 includes receiving, by integration component 114, network asset 112 from an asset management component, the asset management component operative to provide version control for network asset 112. Operation 210 includes a trigger event, which may have been operation 208, or some other event. Illustrated trigger events include a code commit 210a, a network asset update 210b, a timer event 210c, and a manual instigation 210d. Timer event 210c and manual instigation 210d move flow chart 200 directly to grant or revoke access operation 300, which is shown in further detail in FIG. 3. For the other trigger events, code commit 210a and network asset update 210b, flow chart 200 moves to operation 212 in which either (or both) integration component 114 or synchronization component 116 obtains the modification history of network asset 112 from second computing node 104 (e.g., from SCM 130 or general asset management component 150). The modification history should include a user ID and a timeframe.

Operation 214 includes determining a user ID associated with network asset 112, and operation 216 includes determining whether the user ID is valid on the asset management component. Operation 218 includes determining a project ID associated with network asset 112, and operation 220 includes determining a timeframe of the user ID association with network asset 112 (such as a modification date). The timeframe used for determining whether a user is stale, or inactive, may be configurable, in some examples.

Operation 222 includes determining whether the user ID is on a control list in control lists 140. This includes determining whether the user ID is on exclusion control list 144 or inclusion control list 142. Operation 224 includes requesting, by integration component 114, a vulnerability scan of received network asset 112 by a vulnerability scan component (SVS 160 or general vulnerability scan component 180), the vulnerability scan component operative to determine whether network asset 112 has a vulnerability. The vulnerability scan component performs the vulnerability scan and determines whether any vulnerability exists in operation 226. In some examples, the vulnerability scan component comprises SVS 160 and determining whether network asset 112 has a vulnerability comprises determining whether source code has a programming vulnerability.

In operation 228, scan results are received by build machine 110, possibly by integration component 114, and will be used for determining whether to proceed with building or deploying network asset 112. However, as illustrated in FIG. 2, operation 300 is performed to grant or revoke access, as part of provisioning user access rights for the vulnerability scan component. Further detail for an exemplary operation 300 is provided in FIG. 3. It should be understood, however, that operation 300 may be instead performed at a later time.

Shown as following operation 300, a decision operation 230 moves flow chart 200 to either operation 232 or 236. If a sufficiently serious vulnerability has been found, operation 232 ceases further build and deployment activity, and an alert is generated in operation 234, to alert the user to the identified vulnerability or vulnerabilities. Otherwise, network asset 112 is built (e.g. compiled or published, or some other activity) in operation 236 and deployed in operation 238. For an app, deployment may be placing the app into an app store or pushing out a patch.

Figure 3:
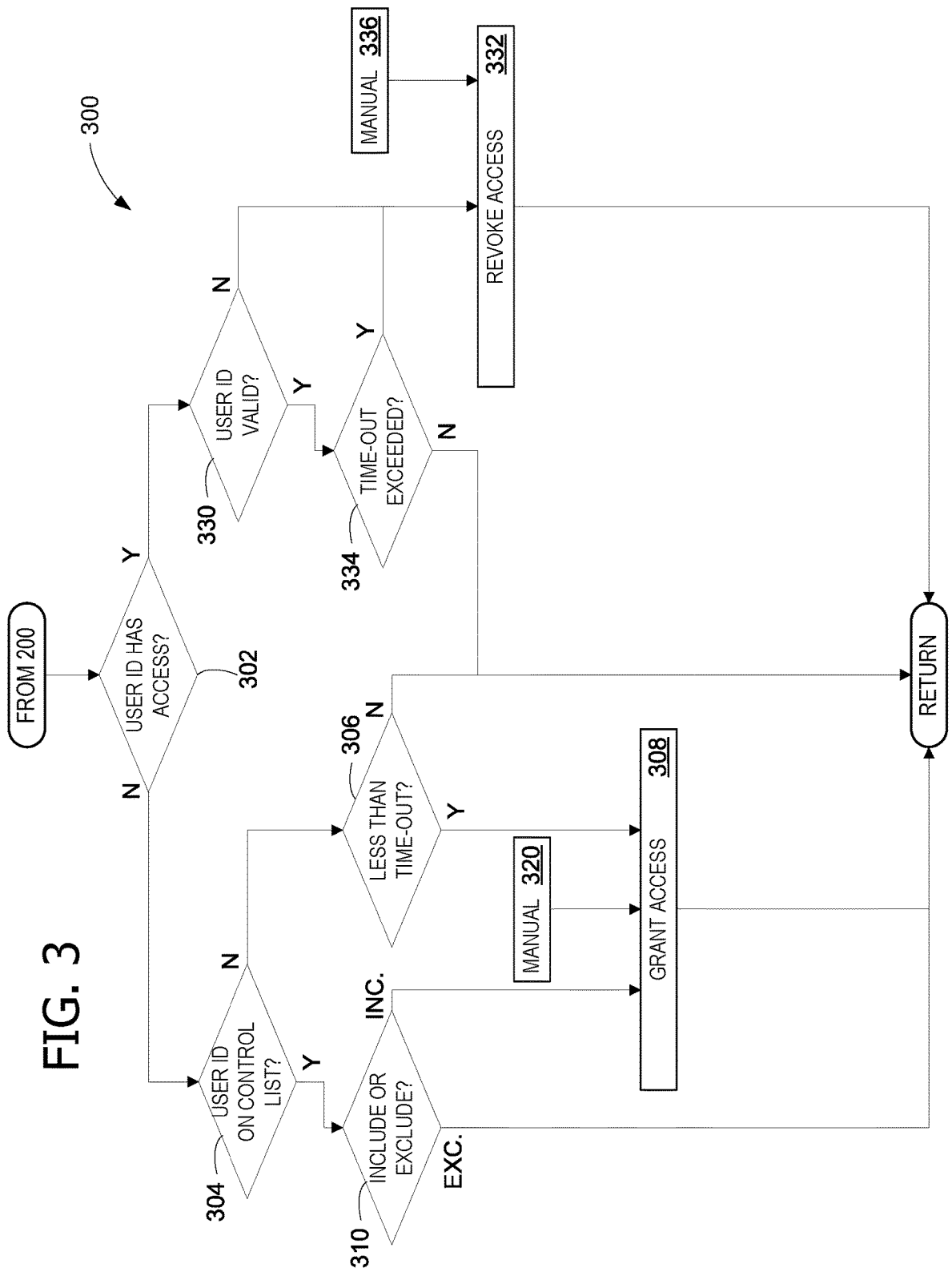
FIG. 3 illustrates further detail for an exemplary operation shown in FIG. 2.

FIG. 3 illustrates further detail for an exemplary operation 300 (first referenced in FIG. 2), effectively implementing PoLP in a JIT framework. The operations illustrated in the detailed flow chart for operation 300 may be performed by a compatible processing unit or computing node, such as computing node 500 of FIG. 5. Operation 300 may optionally be triggered by different events. One trigger may be a build event for a software project, while another trigger may be a scheduled timer event. In some examples, if operation 300 is normally configured to run on a schedule, but the number of available SVS licenses is nearly exhausted, operation 300 may be additionally triggered to run at project build time, to trim some users newly-determined to be stale, and thus free up accessibility.

Decision operation 302 determines whether the user ID already has access to the vulnerability scan component. If not, then after decision operation 304, if the user ID is not on a control list (such as exclusion control list 144), operation 300 moves to decision operation 306. Based at least on the timeframe being less than a time-out threshold, operation 300 moves to granting the user ID access rights to the vulnerability scan component in operation 308. With the combination of decision operations 304 and 306, based at least on the timeframe being less than a time-out threshold and the user ID not being on an exclusion control list, operation 300 grants the user ID access rights to the vulnerability scan component. In some examples, provisioning user access rights for the vulnerability scan component comprises provisioning user access rights for the project ID to the vulnerability scan component. If, however, the timeframe is not less than a time-out threshold, operation 300 concludes without granting access.

Returning to decision operation 304, if the user ID is on a control list, decision operation 310 identifies whether it is exclusion control list 144 or inclusion control list 142. If the user ID is on inclusion control list 142, operation 300 moves to granting the user ID access rights to the vulnerability scan component in operation 308. Operation 308 may also be invoked by manual instigation 320. If, however, the user ID is on exclusion control list 144, operation 300 concludes without granting access.

Returning to decision operation 302, if the user ID already has access, then after decision operation 330, based at least on the user ID not being valid on the asset management component, operation 300 moves to operation 332. Operation 332 includes revoking the user ID access rights to the vulnerability scan component. Returning to decision operation 330, if the user ID is still valid, then decision operation 334 compares the timeframe of the user ID association with network asset 112 with the time-out threshold. Based at least on the timeframe exceeding the time-out threshold, operation 300 moves to operation 332, revoking the user ID access rights to the vulnerability scan component. Operation 332 may also be invoked by manual instigation 336. If, however, the timeframe does not exceed the time-out threshold, operation 300 concludes without revoking access.

In this manner, the security concept of least privilege is implemented automatically: access is revoked after a period of time with no modifications. Additionally, just-in-time provisioning is also used for the vulnerability scan component, leveraging the user account information in the asset management component. With just-in-time provisioning, the end user identity is provisioned (created or updated) at the service provider when the end user tries to access the service provider's service, without the need for prior identity provisioning activity between the identity provider and the service provider.

Figure 4:
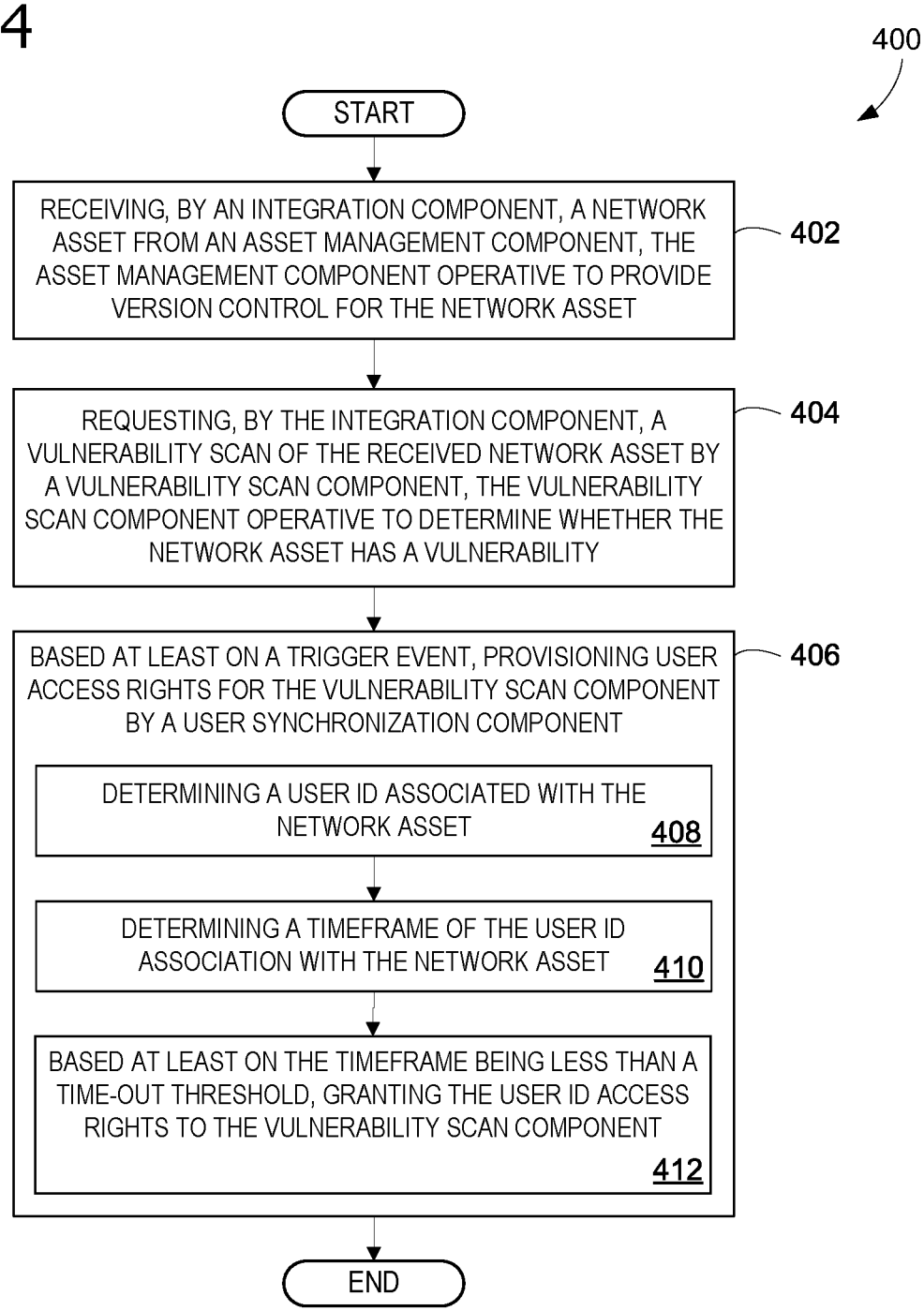
FIG. 4 shows another flow chart illustrating exemplary operations involved in manages access to vulnerability data at scale, that may be used with the arrangement of FIG. 1.

FIG. 4 shows a flow chart 400 illustrating exemplary operations involved in multidimensional privacy control. The operations illustrated in flow chart 400 may be performed by a compatible processing unit or computing node, such as computing node 500 of FIG. 5. Operation 402 includes receiving, by an integration component, a network asset from an asset management component, the asset management component operative to provide version control for the network asset. Operation 404 includes requesting, by the integration component, a vulnerability scan of the received network asset by a vulnerability scan component, the vulnerability scan component operative to determine whether the network asset has a vulnerability. Operation 406 includes, based at least on a trigger event, provisioning user access rights for the vulnerability scan component by a user synchronization component. Further detail for describing provisioning user access rights for the vulnerability scan component in operation 406 is provided in operations 408, 410, and 412. Operation 408 includes determining a user ID associated with the network asset. Operation 410 includes determining a timeframe of the user ID association with the network asset. And operation 412 includes based at least on the timeframe being less than a time-out threshold, granting the user ID access rights to the vulnerability scan component.

In some examples, the operations illustrated in the flowcharts may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements. While the aspects of the disclosure have been described in terms of various examples with their associated operations, a person skilled in the art would appreciate that a combination of operations from any number of different examples or some reordering is also within scope of the aspects of the disclosure.

Exemplary Operating Environment

Figure 5:
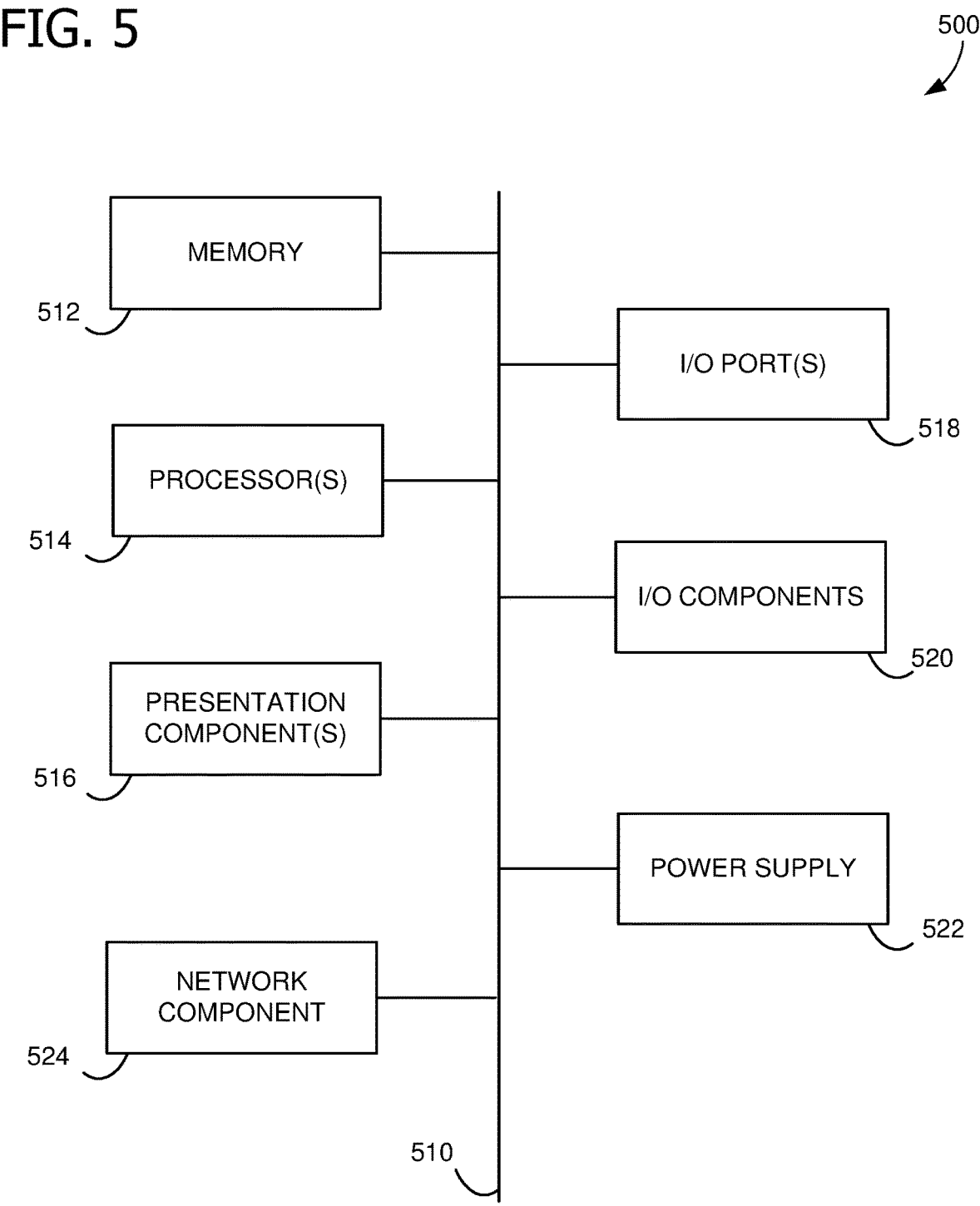
FIG. 5 is a block diagram of an example computing node for implementing aspects disclosed herein.

FIG. 5 is a block diagram of an example computing node 500 for implementing aspects disclosed herein and is designated generally as computing node 500. Computing node 500 is one example of a suitable computing environment and is not intended to suggest any limitation as to the scope of use or functionality of the invention. Neither should the computing node 500 be interpreted as having any dependency or requirement relating to any one or combination of components/modules illustrated.

The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing nodes, etc. The disclosed examples may also be practiced in distributed computing environments, where tasks are performed by remote-processing devices that are linked through a communications network.

Computing node 500 includes a bus 510 that directly or indirectly couples the following devices: memory 512, one or more processors 514, one or more presentation components 516, input/output (I/O) ports 518, I/O components 520, a power supply 522, and a network component 524. Computing node 500 should not be interpreted as having any dependency or requirement related to any single component or combination of components illustrated therein. While computing node 500 is depicted as a seemingly single device, multiple computing nodes 500 may work together and share the depicted device resources. That is, one or more computer storage devices having computer-executable instructions stored thereon may perform operations disclosed herein. For example, memory 512 may be distributed across multiple devices, processor(s) 514 may provide housed on different devices, and so on.

Bus 510 represents what may be one or more busses (such as an address bus, data bus, or a combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and the diagram of FIG. 5 is merely illustrative of an exemplary computing node that can be used in connection with one or more embodiments. Distinction is not made between such categories as 'workstation,_ 'server,_ 'laptop,_ 'hand-held device,_ etc., as all are contemplated within the scope of FIG. 5 and the references herein to a 'computing node_ or a 'computing device._

Memory 512 may include any of the computer-readable media discussed herein. Memory 512 may be used to store and access instructions configured to carry out the various operations disclosed herein. In some examples, memory 512 includes computer storage media in the form of volatile and/or nonvolatile memory, removable or non-removable memory, data disks in virtual environments, or a combination thereof.

Processor(s) 514 may include any quantity of processing units that read data from various entities, such as memory 512 or I/O components 520. Specifically, processor(s) 514 are programmed to execute computer-executable instructions for implementing aspects of the disclosure. The instructions may be performed by the processor, by multiple processors within the computing node 500, or by a processor external to the client computing node 500. In some examples, the processor(s) 514 are programmed to execute instructions such as those illustrated in the flowcharts discussed below and depicted in the accompanying drawings. Moreover, in some examples, the processor(s) 514 represent an implementation of analog techniques to perform the operations described herein. For example, the operations may be performed by an analog client computing node 500 and/or a digital client computing node 500.

Presentation component(s) 516 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly among multiple computing nodes 500, across a wired connection, or in other ways.

Ports 518 allow computing node 500 to be logically coupled to other devices including I/O components 520, some of which may be built in. Examples I/O components 520 include, for example but without limitation, a microphone, keyboard, mouse, joystick, game pad, satellite dish, scanner, printer, wireless device, etc.

In some examples, the network component 524 includes a network interface card and/or computer-executable instructions (e.g., a driver) for operating the network interface card. Communication between the computing node 500 and other devices may occur using any protocol or mechanism over any wired or wireless connection. In some examples, the network component 524 is operable to communicate data over public, private, or hybrid (public and private) using a transfer protocol, between devices wirelessly using short range communication technologies (e.g., near-field communication (NFC), Bluetooth® branded communications, or the like), or a combination thereof.

Although described in connection with an example computing node 500, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing nodes, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device or computing node when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

Exemplary Operating Methods and Systems

An exemplary system for managing access to vulnerability data comprises: an asset management component operative to provide version control for a network asset; a vulnerability scan component operative to determine whether the network asset has a vulnerability; an integration component managing a workflow of receiving the network asset from the asset management component and requesting a vulnerability scan of the received network asset by the vulnerability scan component; and a user synchronization component for, responsive to a trigger event, provisioning user access rights for the vulnerability scan component, wherein provisioning user access rights for the vulnerability scan component comprises: determining a user ID associated with the network asset; determining a timeframe of the user ID association with the network asset; and based at least on the timeframe being less than a time-out threshold, granting the user ID access rights to the vulnerability scan component.

An exemplary method for managing access to vulnerability data, implemented on at least one processor, comprises: receiving, by an integration component, a network asset from an asset management component, the asset management component operative to provide version control for the network asset; requesting, by the integration component, a vulnerability scan of the received network asset by a vulnerability scan component, the vulnerability scan component operative to determine whether the network asset has a vulnerability; and based at least on a trigger event, provisioning user access rights for the vulnerability scan component by a user synchronization component, wherein provisioning user access rights for the vulnerability scan component comprises: determining a user ID associated with the network asset; determining a timeframe of the user ID association with the network asset; and based at least on the timeframe being less than a time-out threshold, granting the user ID access rights to the vulnerability scan component.

One or more exemplary computer storage devices having a first computer-executable instructions stored thereon for managing access to vulnerability data, which, on execution by a computer, cause the computer to perform operations which may comprise: receiving, by an integration component, a network asset from an asset management component, the asset management component operative to provide version control for the network asset; requesting, by the integration component, a vulnerability scan of the received network asset by a vulnerability scan component, the vulnerability scan component operative to determine whether the network asset has a vulnerability; and based at least on a trigger event, provisioning user access rights for the vulnerability scan component by a user synchronization component, wherein provisioning user access rights for the vulnerability scan component comprises: determining a user ID associated with the network asset; determining a timeframe of the user ID association with the network asset; determining whether the user ID is on an exclusion control list, determining a project ID associated with the network asset, based at least on the timeframe being less than a time-out threshold and the user ID not being on an exclusion control list, granting the user ID access rights for the project ID to the vulnerability scan component; based at least on the timeframe exceeding the time-out threshold, revoking the user ID access rights for the project ID to the vulnerability scan component; determining whether the user ID is valid on the asset management component; and based at least on the user ID not being valid on the asset management component, revoking the user ID access rights for the project ID to the vulnerability scan component.

Alternatively, or in addition to the other examples described herein, examples include any combination of the following:
a first computing node holding the user synchronization component and the integration component;
a second computing node in communication with the first computing node, the second computing node holding the asset management component;
a third computing node in communication with the first computing node, the third computing node holding the vulnerability scan component;
a fourth computing node in communication with the second computing node, the fourth computing node transmitting the network asset to the asset management component of the second computing node;
the asset management component comprises an SCM;
the network asset comprises application source code;
the vulnerability scan component comprises an SVS;
determining whether the network asset has a vulnerability comprises determining whether source code has a programming vulnerability;
provisioning user access rights for the vulnerability scan component further comprises determining whether the user ID is on an exclusion control list;
granting the user ID access rights to the vulnerability scan component comprises, based at least on the timeframe being less than a time-out threshold and the user ID not being on an exclusion control list, granting the user ID access rights to the vulnerability scan component.
provisioning user access rights for the vulnerability scan component further comprises, based at least on the timeframe exceeding the time-out threshold, revoking the user ID access rights to the vulnerability scan component;
provisioning user access rights for the vulnerability scan component further comprises determining whether the user ID is valid on the asset management component;
based at least on the user ID not being valid on the asset management component, revoking the user ID access rights to the vulnerability scan component;
determining a project ID associated with the network asset;
provisioning user access rights for the vulnerability scan component comprises provisioning user access rights for the project ID to the vulnerability scan component; and
the trigger event comprises a code commit.

The order of execution or performance of the operations in examples of the disclosure illustrated and described herein may not be essential, and thus may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles 'a,_ 'an,_ 'the,_ and 'said_ are intended to mean that there are one or more of the elements. The terms 'comprising,_ 'including,_ and 'having_ are intended to be inclusive and mean that there may be additional elements other than the listed elements. The term 'exemplary_ is intended to mean 'an example of._ The phrase 'one or more of the following: A, B, and C_ means 'at least one of A and/or at least one of B and/or at least one of C._

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense. While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A system for managing access to vulnerability data, the system comprising:
   at least one processor;
   a memory storing at least an asset management component, a vulnerability scan component, an integration component, and a user synchronization component, the components executed by the at least one processor to:
   provide version control for a network asset using the asset management component;
   determine whether the network asset has a vulnerability using the vulnerability scan component;
   manage a workflow of receiving the network asset from the asset management component and requesting a vulnerability scan of the received network asset by the vulnerability scan component using the integration component; and
   responsive to a trigger event, provision user access rights for the vulnerability scan component using the user synchronization component, wherein provisioning the user access rights for the vulnerability scan component comprises:
   determining a user ID associated with the network asset;
   determining a timeframe of the user ID association with the network asset;
   based at least on the timeframe being less than a time-out threshold, granting the user ID the user access rights to the vulnerability scan component; and
   based at least on the timeframe exceeding the time-out threshold, revoking the user ID the user access rights to the vulnerability scan component.

2. The system of claim 1 further comprising:
   a first computing node holding the user synchronization component and the integration component;
   a second computing node in communication with the first computing node, the second computing node holding the asset management component; and
   a third computing node in communication with the first computing node, the third computing node holding the vulnerability scan component.

3. The system of claim 2 further comprising:
   a fourth computing node in communication with the second computing node, the fourth computing node transmitting the network asset to the asset management component of the second computing node.

4. The system of claim 1 wherein the asset management component comprises a source control management system (SCM) and wherein the network asset comprises application source code.

5. The system of claim 1 wherein the vulnerability scan component comprises a source vulnerability scanner (SVS) and wherein determining whether the network asset has a vulnerability comprises determining whether source code has a programming vulnerability.

6. The system of claim 1 wherein provisioning the user access rights for the vulnerability scan component further comprises:
   determining whether the user ID is on an exclusion control list,
   wherein granting the user ID the user access rights to the vulnerability scan component comprises, based at least on the timeframe being less than a time-out threshold and the user ID not being on an exclusion control list, granting the user ID the user access rights to the vulnerability scan component.

7. The system of claim 1 wherein provisioning the user access rights for the vulnerability scan component further comprises:
   determining whether the user ID is valid on the asset management component; and
   based at least on the user ID not being valid on the asset management component, revoking the user ID the user access rights to the vulnerability scan component.

8. The system of claim 1 further comprising:
   determining a project ID associated with the network asset,
   wherein provisioning the user access rights for the vulnerability scan component comprises provisioning the user access rights for the project ID for the vulnerability scan component.

9. The system of claim 1 wherein the trigger event comprises a code commit.

10. A method for managing access to vulnerability data, implemented on at least one processor, the method comprising:
    receiving, by an integration component, a network asset from an asset management component, the asset management component operative to provide version control for the network asset;
    requesting, by the integration component, a vulnerability scan of the received network asset by a vulnerability scan component, the vulnerability scan component operative to determine whether the network asset has a vulnerability; and
    based at least on a trigger event, provisioning user access rights for the vulnerability scan component by a user synchronization component, wherein provisioning user access rights for the vulnerability scan component comprises:
    determining a user ID associated with the network asset;
    determining a timeframe of the user ID association with the network asset;
    determining whether the user ID is on an exclusion control list;
    based at least on the timeframe being less than a time-out threshold and the user ID not being on the exclusion control list, granting the user ID the user access rights to the vulnerability scan component.

11. The method of claim 10 wherein the asset management component comprises a source control management system (SCM) and wherein the network asset comprises application source code.

12. The method of claim 10 wherein the vulnerability scan component comprises a source vulnerability scanner (SVS) and wherein determining whether the network asset has a vulnerability comprises determining whether source code has a programming vulnerability.

13. The method of claim 10 wherein provisioning the user access rights for the vulnerability scan component further comprises:

based at least on the timeframe exceeding the time-out threshold, revoking the user ID the user access rights to the vulnerability scan component.

14. The method of claim 10 wherein provisioning the user access rights for the vulnerability scan component further comprises:
determining whether the user ID is valid on the asset management component; and
based at least on the user ID not being valid on the asset management component, revoking the user ID the user access rights to the vulnerability scan component.

15. The method of claim 10 further comprising:
determining a project ID associated with the network asset,
wherein provisioning user access rights for the vulnerability scan component comprises provisioning user access rights for the project ID to the vulnerability scan component.

16. The method of claim 10 wherein the trigger event comprises a code commit.

17. One or more computer storage devices having computer-executable instructions stored thereon for managing access to vulnerability data, which, on execution by a computer, cause the computer to perform operations comprising:
receiving, by an integration component, a network asset from an asset management component, the asset management component operative to provide version control for the network asset;
requesting, by the integration component, a vulnerability scan of the received network asset by a vulnerability scan component, the vulnerability scan component operative to determine whether the network asset has a vulnerability; and
based at least on a trigger event, provisioning user access rights for the vulnerability scan component by a user synchronization component, wherein provisioning user access rights for the vulnerability scan component comprises:
determining a user ID associated with the network asset;
determining a timeframe of the user ID association with the network asset;
determining whether the user ID is on an exclusion control list,
determining a project ID associated with the network asset,
based at least on the timeframe being less than a time-out threshold and the user ID not being on an exclusion control list, granting the user ID the user access rights for the project ID to the vulnerability scan component;
based at least on the timeframe exceeding the time-out threshold, revoking the user ID the user access rights for the project ID to the vulnerability scan component;
determining whether the user ID is valid on the asset management component; and
based at least on the user ID not being valid on the asset management component, revoking the user ID the user access rights for the project ID to the vulnerability scan component.

18. The one or more computer storage devices of claim 17 wherein
the asset management component comprises a source control management system (SCM) and wherein the network asset comprises application source code;
the vulnerability scan component comprises a source vulnerability scanner (SVS) and wherein determining whether the network asset has a vulnerability comprises determining whether source code has a programming vulnerability; and
the trigger event comprises a code commit.

* * * * *